United States Patent [19]

Chai et al.

[11] Patent Number: 4,841,530
[45] Date of Patent: Jun. 20, 1989

[54] CR-DOPED SCANDIUM BORATE LASER

[75] Inventors: Bruce H. Chai, Bridgewater; Shui T. Lai, Florham Park; Margaret N. Long, Landing, all of N.J.

[73] Assignee: Allied-Signal Inc., Morris Township, Morris County, N.J.

[21] Appl. No.: 845,215

[22] Filed: Mar. 27, 1986

[51] Int. Cl.$^4$ .............................................. H01S 3/16
[52] U.S. Cl. ...................................... 372/41; 372/20; 372/39; 372/66; 252/301.17
[58] Field of Search ................ 372/41, 66, 39, 20; 252/301.17

[56] References Cited

U.S. PATENT DOCUMENTS 4,272,733 6/1981 Walling et al. ...................... 372/41
4,490,822 12/1984 Walling et al. ...................... 372/41

Primary Examiner—James W. Davie
Assistant Examiner—Xuan T. Vo
Attorney, Agent, or Firm—Gerhard H. Fuchs; Richard C. Stewart

[57] ABSTRACT

A broadly wavelength-tunable laser is provided which comprises as the laser medium a single crystal of $MBO_3:Cr^{3+}$, where M is selected from the group of Sc, In and Lu. The laser may be operated over a broad temperature range from cryogenic temperatures to elevated temperatures. Emission is in a spectral range from red to infrared, and the laser is useful in the fields of defense, communications, isotope separation, photochemistry, etc.

18 Claims, 3 Drawing Sheets

FIG. 1 POLARIZED ABSORPTION SPECTRA OF $ScBO_3:Cr^{3+}$

FIG. 2 FLUORESCENCE SPECTRA OF ScBO₃:Cr³⁺ AT ROOM TEMPERATURE

CR-DOPED SCANDIUM BORATE LASER

This application is filed on behalf of the U.S. Government. The invention disclosed herein was made under DOE Contract No. W-7405-ENG-48.

BACKGROUND OF THE INVENTION

1. Field of the Invention

This invention relates to lasers and, more particularly, to a solid-state laser whose laser medium is a single crystal of $ScBo_3:Cr^{3+}$ or its isomorphs.

2. Description of the Prior Art

A number of solids, both crystals and glasses, have been found to be suitable for laser action since the first (solid-state) laser was demonstrated by Maiman in 1960. Generally, the laser-active materials involve a rare earth, actinide, or transition metal dopant in a crystalline or a glass host. An extensive treatment of then-known solid-state lasers was published in 1976—*Solid-State Laser Engineering,* W. Koechner, Springer-Verlag, New York. More recently, a compilation of laser crystals was presented in *Laser Crystals,* A. A. Kaminskii, Springer-Verlag, New York. (1981).

Among the materials which lase are a number of chromium doped materials including: garnet $Gd_3Sc_2Ga_3O_{12}: Cr^{3+}$ (GSGG:$Cr^{3+}$) (A. Beimowski et al., XIIth Int'l. Quantum Electronics Conference, Munich, June, 1982); alexandrite ($BeAl_2O_4:Cr^{3+}$), a naturally occurring mineral having the chrysoberyl structures (U.S. Pat. No. Re 31,057 and U.S. Pat. No. 4,272,733); emerald, $Be_3Al_2(SiO_3):Cr^{3+}$(M. L. Shand and J. C. Walling, IEEE J. Quantum Electron. QE-18, 1829, November 1982); $KZnF_3:Cr$ (U. Branch and U. Duvv. Opt. Com. 49, 61, February 1984); and $ZnWO_4:Cr$ (W. Kolbe, K. Petermann and G. Huber, IEEE J. Quantum Electron. QE-21, 1596, October 1985). Among the distinctive features of the alexandrite, emerald, GSGG:$Cr^{3+}$ and KZNF$_3$:$Cr^{3+}$ lasers is their tunability.

SUMMARY OF THE INVENTION

In accordance with the present invention, a laser is provided that comprises a laser medium comprising a single crystal of $ScBO_3:Cr^{3+}$ and isomorphs of $ScBO_3$ such as $InBO_3$ and $LuBO_3$, and means for exciting the laser medium to emit coherent radiation. Generally, the laser includes mirrors forming an optical resonator adapted for maintaining laser oscillations between the mirrors. The output of the laser is broadly tunable; thus, the output can be selected at any wavelength over a band that extends from the deep red to near infrared range of the electromagnetic spectrum.

Besides tunability, another advantage provided by the $ScBO_3:Cr^{3+}$ laser medium and its isomorphs is four-level operation. A four-level laser is a class of lasers characterized by the fact that the terminal level for the laser transition is not the ground state of the ion. In these lasers there can be little if any reabsorption of laser emission by the unexcited ground state ions within the laser host. This permits low threshold, high efficiency operation of the laser. In $ScBO_3:Cr^{3+}$, as in other phono-terminated lasers, the laser transition involves the simultaneous emission of a photon and a phonon, so any reabsorption of this emission requires the simultaneous absorption of both quanta. The probability of this reabsorption is understandably low, so the threshold for $ScBo_3:Cr^{3+}$ four-level laser action is low.

A very significant advantage of the laser medium is the long CR $4_{T2}$ lifetime in the $ScBO_3$ crystal structure. In the cases of emerald and alexandrite and $ZnWO_4$, the $4_{T2}$ lifetime is only a few micro-seconds. Such short lifetimes make flash lamp-pumped laser operations quite difficult. With the medium of the present invention, the $4_{T2}$ lifetime is on the order of 110 micro-seconds which makes the medium quite amenable to flash lamp pumping.

The laser of the present invention has several other advantages over previously known tunable lasers. The absorption spectrum is red-shifted so that diode pumping is viable. The laser is simpler than dye lasers, which require a pump to circulate the dye, which, in turn, tends to be chemically unstable and toxic, corrosive, or both. The present laser emits mostly in the invisible portion of the near IR spectrum and, operates at room temperature. Compared with dye lasers, the laser provides high power operation with less need for auxiliary equipment, and Q-switched operation is also possible.

DETAILED DESCRIPTION OF THE INVENTION

The laser medium employed in this invention comprises a single crystal of $MBO_3$ doped with $Cr^{3+}$ ($MBO_3:Cr^{3+}$), where M is selected from the group of Scandium, Indium, and Lutetium. The medium is excited by a pump source of incoherent or coherent radiation and emits coherent radiation at a wavelength in the deep red to near infrared range of the electromagnetic spectrum. The laser may be tuned to permit the output wavelength to be selected.

Chromium-doped scandium borate and the isomorphs thereof ($InBO_3$ and $LuBO_3$) have a structure of trigonal system (Space Group R$\bar{3}$c) and can be prepared synthetically by either Kryopoulos or Czochralski growth. For use as a laser medium, the crystal is preferably either rod-shaped or slab-shaped. A slab preferably has a substantially rectangular cross section in a plane normal to its long dimension.

The $MBO_3:Cr^{3+}$ laser medium is optically pumped. In general, it is desirable to have pump radiation absorbed uniformly throughout the laser medium. Since absorption depends on chromium concentration, there is an inverse relationship between rod diameter or slab thickness and optimum dopant concentration. For typical diameters and thicknesses, the chromium dopant concentration is preferably in the range from about 0.005 to about 20 atom percent with respect to scandium octahedral sites, more preferably from about 0.1 to about 5 atom percent.

Figure 1:
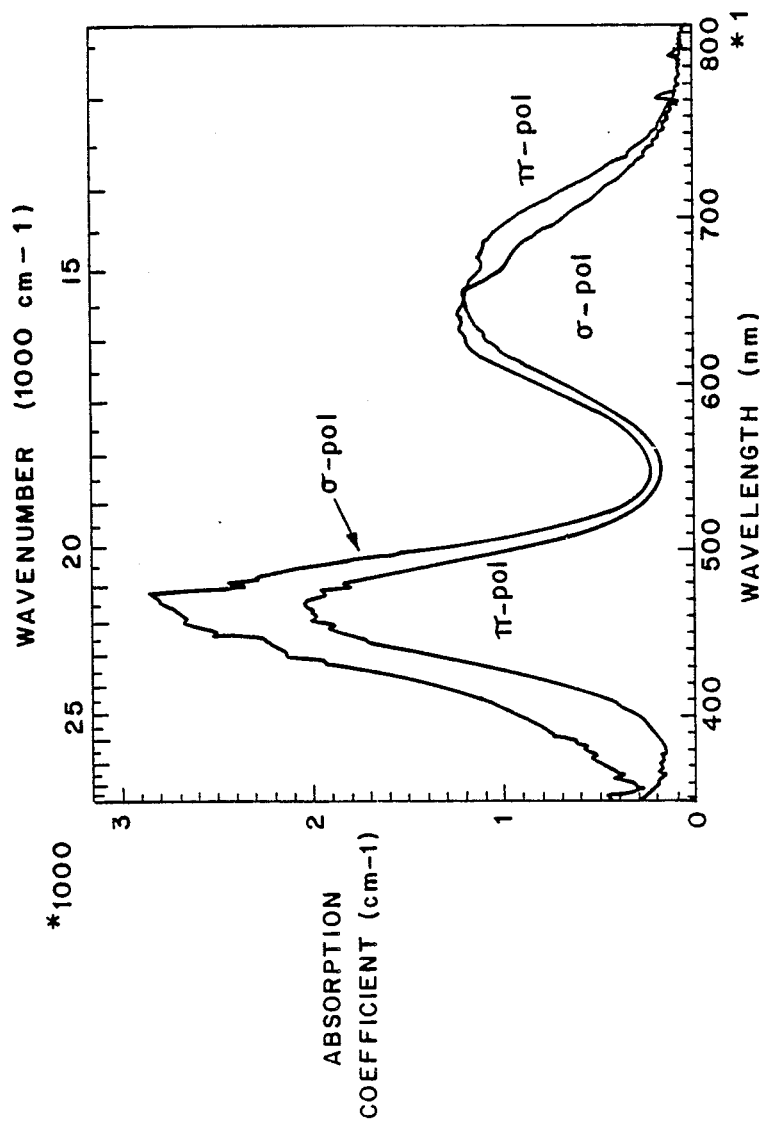
FIG. 1 is an absorption spectrum for $ScBO_3:Cr^{3+}$.

Suitable pump lamps are those that emit strongly in the wavelength region in which $MBO_3:Cr^{3+}$ absorbs. FIG. 1 graphically illustrates the absorption coefficient for $ScBO_3:CR^{3+}$ over the wavelength region of between about 400 and about 800 nm. For $ScBO_3:Cr^{3+}$ either pulsed or continuous lamps that emit intense incoherent light at wavelengths shorter than about 730 nm are suitable. Such lamps, well known in the art, include gaseous discharge lamps, filled with xenon and- /or krypton and designed to operate either continuous wave (cw) or pulsed, and metallic vapor sources such as mercury, sodium, cesium, rubidium, and/or potassium. A cw mercury arc lamp has been found particularly suitable as a pumping source for cw laser operation and a pulsed xenon arc lamp particularly suitable as a pumping source for pulsed laser operation. Diode pumping (such as AlGaAs diodes) is also applicable.

Alternatively, the $MBO_3:Cr^{3+}$ laser medium may be pumped with a coherent light source, either pulsed or cw, that emits in the absorbing wavelength region. For cw excitation, the krypton ion and argon ion lasers are representative. For pulsed laser excitation, almost any coherent source having adequate power and an emission wavelength below 730 nm would be an effective pump for a $ScBO_3:Cr^{3+}$ laser. Examples of suitable sources are doubled Nd:YAG, excimer lasers, and nitrogen lasers.

In addition to the basic elements of the laser, i.e., the laser medium and optical pump, the laser of the present invention may optionally include means for Q-switching. The Q-switch "spoils" the quality factor, Q, of the cavity for an interval of time during which pump energy is stored. At the appropriate moment, the Q-switch is turned to the high gain condition, and the stored energy in the medium is suddenly released in a "giant pulse" of very short duration. Q-switch means many comprise a saturable dye absorber, an acousto-optic Q-switch, or a polarizer and Pockels cell placed in the beam path. The laser may also be mode-locked to produce pulse widths inversely related to the bandwidth.

The $ScBO_3:Cr^{3+}$ laser is tunable over the range 778–892 nm, pumped with 2 W cw input. The lasing wavelength under free running conditions is about 842 nm, significantly longer than the wavelength at which most previously known Cr-doped solid state lasers emit.

Figure 2:
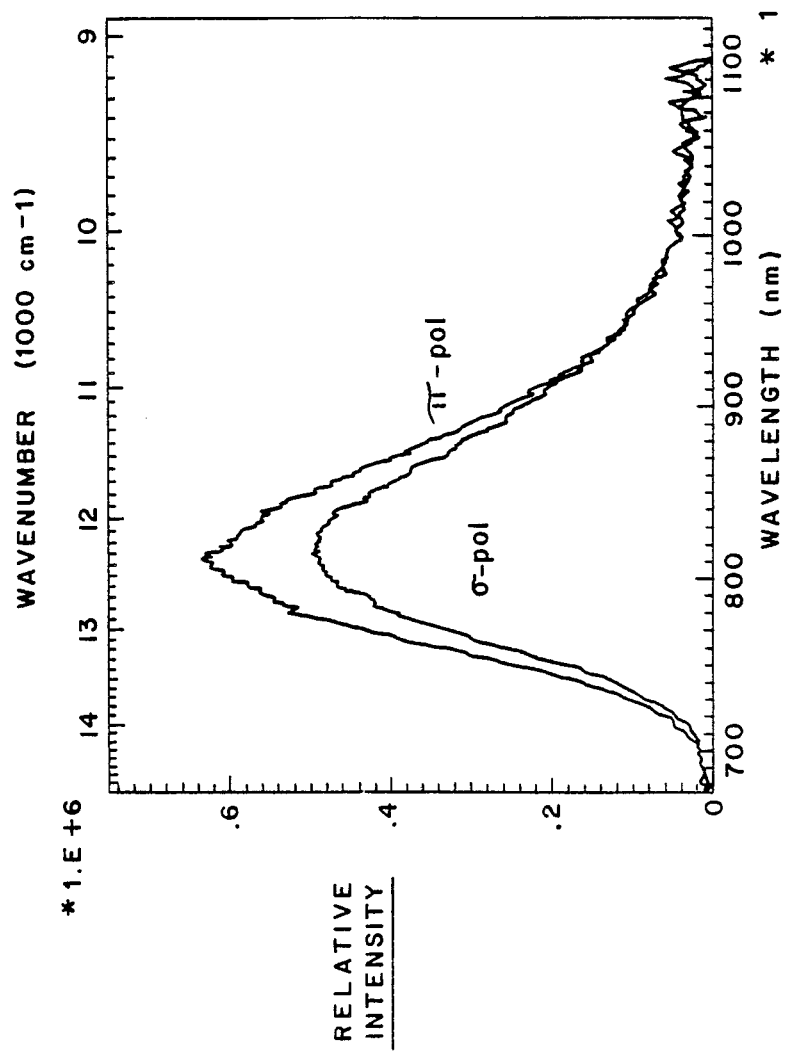
FIG. 2 is a fluorescence spectrum for $ScBO_3:Cr^{3+}$.

As is shown in FIG. 2, the fluorescence band width (730–1000 nm) is significantly red-shifted compared to that of $GSGG:Cr^{+3}$ (715–815 nm). The $ScBO_3$ lifetime is 115 $\mu s$, The 115 $\mu s$ lifetime is optimal for flashlamp pumping or long-pulse laser pumping. The emission cross section is $1.2 \times 10^{-20}$ cm$^2$ at 832 nm, which is higher than that of GSGG:Cr or alexandrite ($\approx 8 \times 10^{-21}$ cm$^2$).

To accomplish tuning, any conventional means may be used. Examples of suitable means include a prism, optical grating, birefringent filter, multilayer dielectric coated filter, or lens having longitudinal chromatic aberration. Particularly suitable is a birefringent filter of the general type described by G. Holtom and O. Teschke, "Design of a Birefringent Filter for High-Power Dye Lasers," IEEE J. Quantum Electron. QE-10, 577 (1974). This type of filter is sometimes referred to as a "Lyot filter." (B. Lyot, Compt. Rend. 197, 1593 (1933)).

A high power $MBO_3:Cr^{3+}$ laser may comprise the basic laser, as described above, as the "oscillator stage", and a laser amplifier. The oscillator stage provides input radiation for one or more "amplifier stages," which typically include a $MBO_3:Cr^{3+}$ crystal and flashlamp, or other pump source, mounted inside an optical cavity.

An advantage of $MBO_3:Cr^{3+}$ as compared with some other tunable solid-state laser materials is that it can operate at room temperature and above, in addition to lower temperatures. Depending on the power level, it may be desirable to include means for controlling the laser rod temperature. Temperature control means may be any of those well known in the art; for example, a circulating fluid adapted for absorbing heat from, or transmitting heat to, the laser medium. The circulating fluid may be air, water, a cryogenic liquid, etc. A heater is used to control the fluid temperature when necessary.

Figure 3:
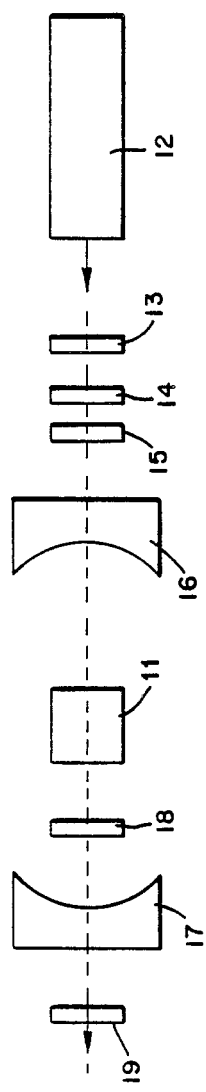
FIG. 3 is a schematic illustration of a laser apparatus with optional tuner.

FIG. 3 illustrates a laser-pumped laser apparatus within the scope of this invention. The laser medium 11 comprises a $ScBo_3:Cr^{3+}$ crystal and the pumping source 12 is a laser. The pump beam passes through optional elements 13, a light chopper, 14, a neutral density filter, and 15, a focusing lens. The laser cavity is defined by mirrors 16 and 17. Input mirror 16 has good transmission at the pump wavelength, but output mirror 17 need not. Wavelength tuning is accomplished with tuning element 18, which may be a birefringent tuner. Optional filter 19 absorbs the pump beam but passes the laser output beam.

Figure 4:
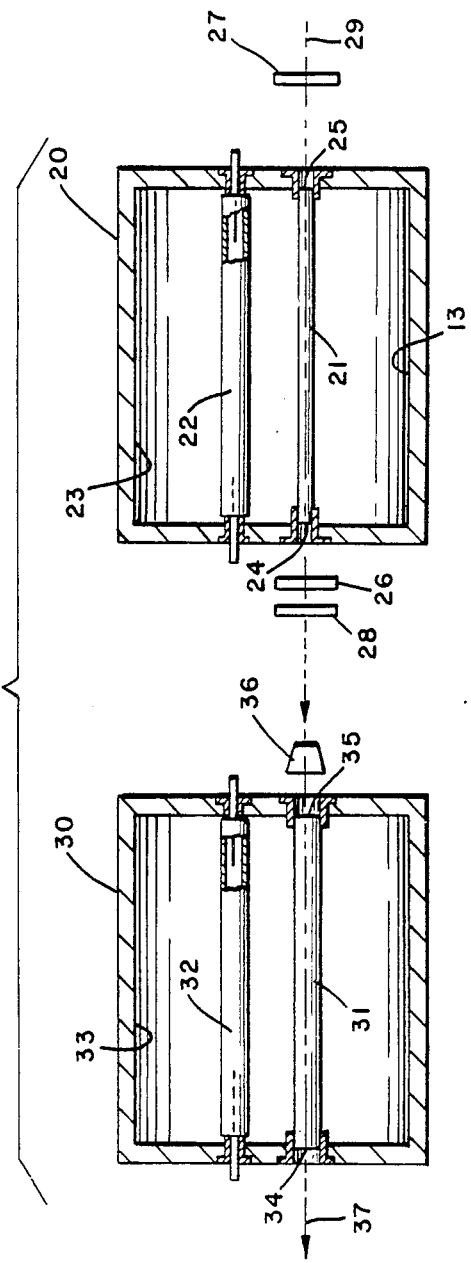
FIG. 4 is a diagrammatic illustration in partial cross section of an oscillator-amplifier laser system.

FIG. 4 illustrates a flash-lamp pumped laser of this invention that includes a flashlamp-pumped amplifier stage. The oscillator stage comprises laser medium 21 and flashlamp 22 in a housing 20, whose highly reflective inner surface 23 defines an elliptical cavity. Reflection at surface 23 may be diffuse or specular. The axes of the laser medium 21 and the pumping source 22 are each located along a focal line of the ellipse formed by container 20. Laser medium 21 is normally provided with coated ends 24 and 25 having a conventional dielectric anti-reflection coating. Concave spherical end(s) may be used to compensate for thermal lensing effects at high pump rates. Completely reflecting mirror 27, optional tuning element 26, and partially reflecting mirror 28 are positioned external to container 20 along cylindrical axis 29 of laser medium 21. Mirrors 27 and 28 may both be partially reflecting. If necessary to maintain the desired operating temperature, laser medium 21 and pumping source 22 are cooled by a fluid circulated through container 20. Lasing action is evidenced by emission of highly collimated coherent radiation whose wavelength is determined by the orientation of the tuning element 26. The radiation emanates from partially reflecting mirror 28.

The amplifier stage is located in the output beam of the oscillator stage. It consists essentially of a container 30, whose highly reflective inner surface 33 defines an elliptical cavity. An amplifier rod 31, excited by flashlamp 32, is normally provided with coated ends 34 and 35 having a conventional dielectric anti-reflection coating. The amplifier rod may be of larger diameter than the oscillator rod 21, in which case a beam expanding telescope 36 is located between the stages in order to match the beam size to the rod size. Unlike the oscillator stage, the amplifier stage normally does not have mirrors at its ends to form a cavity, and the amplification of the oscillator output occurs during only one pass of the laser beam through the amplifier rod. However, for some applications, the amplifier may be fitted with partially reflecting mirrors to feed back part of the amplifier output into the amplifying medium. The spectral and temporal characteristics of the output of this regenerative oscillator can then be determined by injecting a suitably tailored signal from the primary oscillator in a manner similar to that employed with the single pass amplifier. More than one amplifier stage may be used. The amplified output shown as arrow 37 emanates from amplifier rod 31.

The following Example is presented in order to provide a more complete understanding of the invention. The specific techniques, conditions, materials, and reported data set forth to illustrate the principles and practice of the invention are exemplary and should not be construed as limiting the scope of the invention.

EXAMPLE

A $ScBO_3Cr^{3+}$ parallelepiped sample, 1.20 cm×0.5 cm×0.6 cm, with 0.4 atom percent of Cr substituting for Sc was used in a cw laser-pumped laser cavity of the type shown in FIG. 3. A 3 W krypton laser beam is directed through a light chopper and a neutral density filter and is focused by a lens. The laser cavity is defined by mirrors. The input mirror is a good reflector at the lasing wavelengths (99.9% reflectivity at 842 nm) and has good transmission at the pump wavelength (647.1 nm). The output mirror is also a good reflector (98.5% reflectivity at 842 nm). The input and output mirrors are concave, with radii of 10 cm each. The mirrors are positioned ~19 cm apart, and the center of the sample is located near the (approximately) common focal point of the mirrors. Specifically, the pump beam is focused with a beam waist of about 60 micrometers at the center of the $ScBo_3:Cr^{+3}$ sample. A single element birefringent filter is included in the cavity for wavelength tuning. The pump beam was chopped at a duty cycle of 3% to reduce heating effects (compared with cw pumping). With 2 W absorbed power along the 1.20 cm length of the sample, tunable laser output was measured from 778 nm to 892 nm. At free running conditions (without the birefringent element), $ScBO_3:Cr^{3+}$ lases at 841 nm.

We claim:

1. A laser comprising:
a laser medium comprising a single crystal of $MBO_3:Cr^{3+}$, where M is selected from the group consisting of scandium, indium and lutetium; and means for exciting the laser medium to emit coherent radiation.

2. The laser of claim 1 in which the laser medium is $ScBO_3:Cr^{3+}$.

3. The laser of claim 1 in which the laser medium is substantially in the shape of a cylindrical rod whose long dimension is along the cylinder axis.

4. The laser of claim 1 in which the laser medium is substantially in the shape of a slab having a substantially rectangular cross-section in a plane normal to its long dimension.

5. The laser of claim 1 in which the $Cr^{3+}$ concentration is in the range between about 0.005 and about 20 atom percent with respect to M octahedral sites.

6. The laser of claim 1 in which the means for exciting the laser medium comprises a pulsed incoherent light source emitting at wavelengths shorter than about 730 nm.

7. The laser of claim 1 in which the means for exciting the laser medium comprises a continuous incoherent light source emitting at wavelengths shorter than about 730 nm.

8. The laser of claim 1 in which the means for exciting the laser medium comprises a pulsed coherent light source emitting at wavelengths shorter than about 730 nm.

9. The laser of claim 1 in which the means for exciting the laser medium comprises a continuous coherent light source emitting at wavelengths shorter than about 730 nm.

10. The laser of claim 1 further comprising means for Q-switching the laser.

11. The laser of claim 1 further comprising means for controlling the temperature of the laser medium.

12. The laser of claim 1 further comprising means for tuning the coherent radiation in a range of about 778 nm to about 892 nm.

13. The laser of claim 2 in which the laser medium is substantially in the shape of a cylindrical rod whose long dimension is along the cylinder axis.

14. The laser of claim 2 in which the $Cr^{3+}$ concentration is in the range between about 0.005 and about 20 atom percent with respect to scandium octahedral sites.

15. The laser of claim 2 in which the means for exciting the laser medium comprises one of (a) a pulsed incoherent light source emitting at wavelengths shorter than about 730 nm, (b) a continuous incoherent light source emitting at wavelengths shorter than about 730 nm, (c) a pulsed coherent light source emitting at wavelengths shorter than about 730 nm and (d) a continuous coherent light source emitting at wavelengths shorter than about 730 nm.

16. The laser of claim 2 further comprising means for Q-switching the laser.

17. The laser of claim 2 further comprising means for controlling the temperature of the laser medium.

18. The laser of claim 2 wherein said laser is capable of generating coherent radiation in a range of about 778 nm to about 892 nm, and further comprising means for tuning the coherent radiation to a specified value in said range.

* * * * *